US012793457B2

(12) United States Patent
Zaman et al.

(10) Patent No.: US 12,793,457 B2
(45) Date of Patent: Nov. 10, 2026

(54) DOCUMENT MANAGEMENT SYSTEM AND METHODS FOR AUTOMATIC FORMATTING OF FIELDS IN DOCUMENTS

(71) Applicant: Kyocera Document Solutions Inc., Osaka (JP)

(72) Inventors: Selim Zaman, San Mateo, CA (US); Chikara Yuki, Walnut Creek, CA (US)

(73) Assignee: Kyocera Document Solutions Inc., Osaka (JP)

( * ) Notice: Subject to any disclaimer, the term of this patent is extended or adjusted under 35 U.S.C. 154(b) by 265 days.

(21) Appl. No.: 18/654,394

(22) Filed: May 3, 2024

(65) Prior Publication Data

US 2025/0342709 A1 Nov. 6, 2025

(51) Int. Cl.
*G06V 30/19* (2022.01)
*G06F 16/93* (2019.01)
*G06V 30/416* (2022.01)
*G06V 30/418* (2022.01)

(52) U.S. Cl.
CPC ........ *G06V 30/1902* (2022.01); *G06V 30/416* (2022.01); *G06V 30/418* (2022.01); *G06F 16/93* (2019.01)

(58) Field of Classification Search
CPC .... G06F 16/93; G06V 30/10; G06V 30/1902; G06V 30/19013; G06V 30/416; G06V 30/413; G06V 30/418; G06V 30/414; G06V 30/36
USPC .......................................................... 382/177
See application file for complete search history.

(56) References Cited

U.S. PATENT DOCUMENTS

| | | | | |
|---|---|---|---|---|
| 8,239,350 | B1 * | 8/2012 | Vespe | G06F 40/126 707/687 |
| 12,481,773 | B2 * | 11/2025 | Park | G06F 21/6254 |
| 2013/0007598 | A1 | 1/2013 | Draper et al. | |
| 2016/0110445 | A1 * | 4/2016 | Andrews | G06F 16/2465 707/748 |
| 2020/0026970 | A1 * | 1/2020 | Berseth | G06V 30/2455 |
| 2020/0334409 | A1 * | 10/2020 | Andrusenko | G06F 40/103 |
| 2022/0229973 | A1 * | 7/2022 | D'Oria | G06F 40/174 |
| 2024/0296689 | A1 * | 9/2024 | Prasad | G06V 10/98 |

* cited by examiner

*Primary Examiner* — Chineyere Wills-Burns
*Assistant Examiner* — Emmanuel Silva-Avina
(74) *Attorney, Agent, or Firm* — Millen, White, Zelano & Branigan P.C.; William F. Nixon

(57) ABSTRACT

A storage system of a document management system receives a plurality of documents imported using an optical character recognition (OCR) device. The OCR device scans a set of documents to generate a set of electronic documents. An intelligent module processes the set of electronic documents to detect date fields having date characters. The date characters are in a date format to indicate a date within the electronic document. The intelligent module includes a detector module to identify date fields within the document. An adjustment module determines if the received format of the date characters in the date field matches a set format specified within the storage system. If not a match, then the adjustment module adjusts the format of the date characters within the original electronic document to generate a modified electronic document. The original electronic document and the modified electronic document are stored together within the storage system.

20 Claims, 5 Drawing Sheets

DOCUMENT MANAGEMENT SYSTEM AND METHODS FOR AUTOMATIC FORMATTING OF FIELDS IN DOCUMENTS

FIELD OF THE INVENTION

The present invention relates to automatically formatting a field in a document in accordance with a specific format. In particular, the present invention relates to automatically formatting the date fields in a plurality of imported documents according to a specified format or language.

DESCRIPTION OF THE RELATED ART

Users of document management systems often consider international documents that contain date fields having a variety of formats. The format may depend on the regional date format of the country of origin of the document. For example, some regions may use a Month/Day/Year format while other regions use the Day/Month/Year format. Further, different languages may not make the actual format apparent to someone who does not speak that language.

When a large number of documents are uploaded having varying date fields to a document management system, downstream processing of the documents, whether manual or automatic, becomes cumbersome or error-prone due to mismatched date formats between the various documents. Further, date fields may not be readily apparent to the document management system.

SUMMARY OF THE INVENTION

A method for managing documents is disclosed. The method includes importing a plurality of documents into a storage system using an optical character recognition device. The plurality of documents is scanned to capture characters. The method also includes detecting a date field having date characters within the captured characters of an original electronic document generated from the plurality of documents. The method also includes determining a received format for the date characters within the date field. The method also includes determining that the received format does not match a set format for the date characters within the storage system. The method also includes adjusting the date characters within the date field of the original electronic document to match the set format. Pixels for the date characters are modified within the original electronic document to generate a modified electronic document. The method also includes storing the modified electronic document and the original electronic document in the storage system. The modified electronic document includes the date characters in the date field in the set format and the original electronic document includes the date characters of the date field in the received format.

A non-transitory computer-readable medium having stored thereon processor-executable instructions for performing operations is disclosed. The operations include importing a plurality of documents into a storage system using an optical character recognition device. The plurality of documents is scanned to capture characters. The operations also include detecting a date field having date characters within the captured characters of an original electronic document generated from the plurality of documents. The operations also include determining a received format for the date characters within the date field. The operations also include determining that the received format does not match a set format for the date characters within the storage system. The operations also include adjusting the data characters within the date field of the original electronic document to match the set format. Pixels for the date characters are modified within the original electronic document to generate a modified electronic document. The operations also include storing the modified electronic document and the original electronic document in the storage system. The modified electronic document includes the date characters in the date field in the set format and the original electronic document includes the date characters of the date field in the received format.

A system is disclosed. The system includes a storage system to store electronic documents. The system also includes an optical character recognition device coupled to the storage system to scan and generate the electronic documents from a plurality of documents. The system also includes a processor. The system also includes a memory storing instructions that, when executed on the processor, configures the system to import the plurality of documents into the storage system using the optical character recognition device. The plurality of documents is scanned to capture characters. The system also is configured to detect a date field having date characters within the captured characters of an original electronic document generated from the plurality of documents. The system also is configured to determine a received format for the date characters within the date field. The system also is configured to determine that the received format does not match a set format for the date characters within the storage system. The system also is configured to adjust the date characters within the date field of the original electronic document to match the set format. Pixels for the date characters are modified within the original electronic document to generate a modified electronic document. The system also is configured to store the modified electronic document and the original electronic document in the storage system. The modified electronic document includes the date characters in the date field in the set format and the original electronic document includes the date characters of the date field in the received format.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
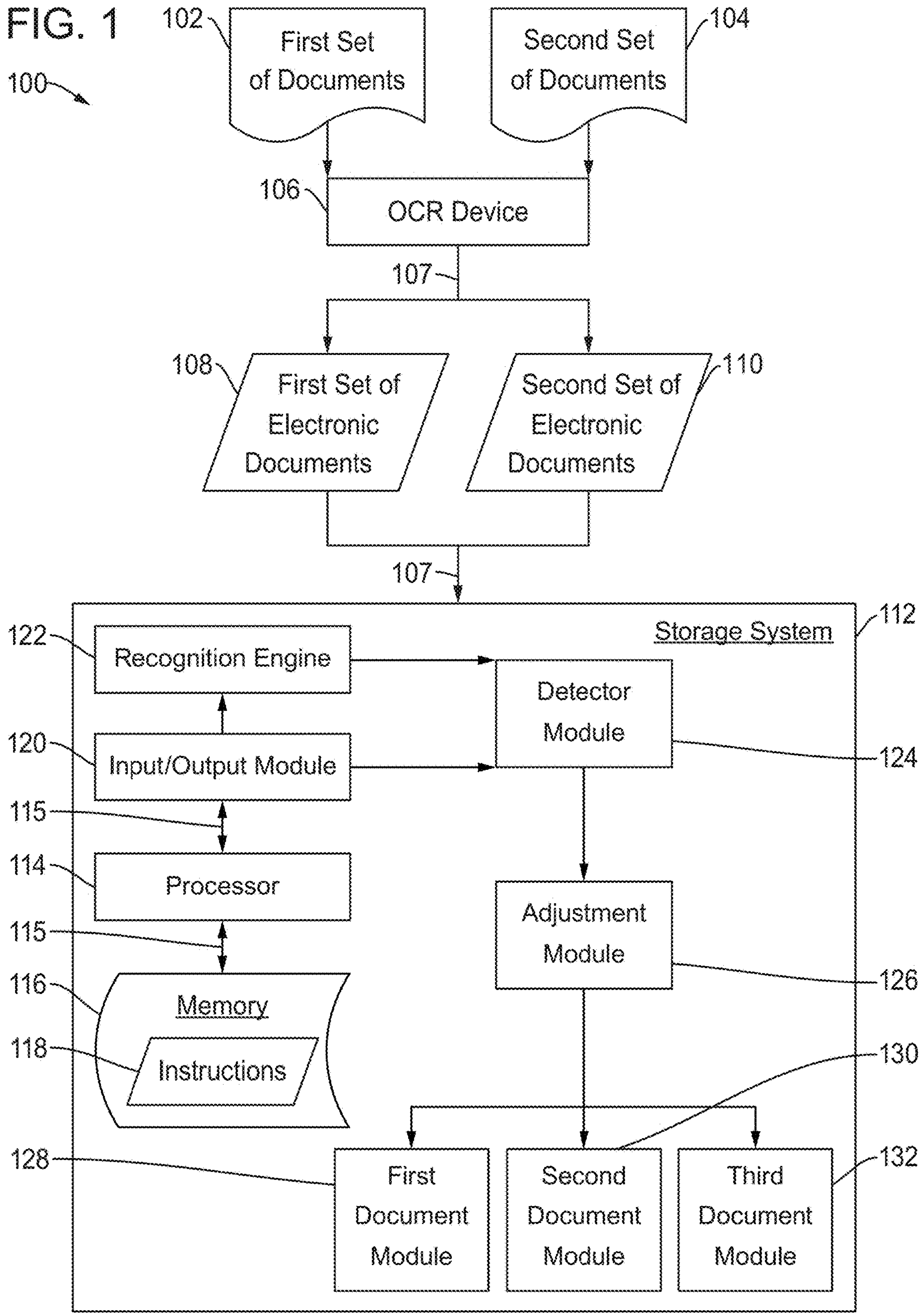
FIG. 1 illustrates a block diagram of a document management system according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide an intelligent module within a document management system to pre-process uploaded documents to detect date fields and formats. The disclosed embodiments also compare the detected date fields and formats with the preferred date format for a user. If the date format in the document is different than the preferred format, then the characters in the date field are changed to the preferred date format for the user. The pre-processed document has the date fields harmonized to the preferred format for the user.

Handwritten date fields are processed using additional handwriting recognition and alteration modules. If the date fields are ambiguous, then a prompt is provided to the user for manual intervention. This prompt may occur if the date field is handwritten or digital. Date fields are verified and updated automatically.

A date field may be a field in a document that contains date information in a specific format. The formats for date fields may be specified by a global setting for a given document. The default setting may be changed by the user for a given document.

A date format may be the format in which a date is specified in terms of day, month, and year. The format may vary by country or region. If dd is the day, mm is the month, and yyyy is the year, then most date formats are dd/mm/yyyy or mm/dd/yyyy. Date formats also may be yyyy/mm/dd or other variations.

Variation also may be found in the demarking symbol, such as dd-mm-yyyy, dd/mm/yyyy, or dd mm yyyy. Further, the month may be spelled in full or abbreviated as opposed to digits. For example, date format may be 2 Apr. 1988, Apr. 2, 1988, or Apr. 2, 1988.

The disclosed embodiments aim to harmonize date formats in an incoming or uploaded document into the preferred format for the user as specified by the user or from the user's browser setting. The disclosed system may include existing document management modules, a third-party handwriting recognition engine, a date field and format detector, and a date format adjustment module.

In some embodiments, the original document also is stored in a database, so it may be accessed by the external party who likes to view in the original date format. Each date of the formatted document, therefore, will have two versions stored in the database as pairs. Other actions within the document management system on these documents will happen in tandem on each version, such as deletions, additions, retention, and the like.

FIG. 1 depicts a block diagram of a document management system 100 according to the disclosed embodiments. Document management 100 may receive large batches of documents, processing them, and manage their access and use in operations. As part of this, document management system 100 uses storage system 112 that stores documents that have been received and processed within system 100. One feature of the processing may be scanning or importing batches of documents by optical character recognition (OCR) device 106.

OCR device 106 is communicatively coupled to storage system 112 within system 100. OCR device 106 may be connected to storage system 112 over a network 107. OCR device 106 may be within a printing device, a scanner, a computing device, and the like. OCR device 106 is disclosed in greater detail below by FIG. 2. Within system 100, OCR device 106 helps with the importation of large batches of documents, such as records, books/texts, forms, or other data that is in a document that is captured electronically to be managed using storage system 112.

For example, a first set of documents 102 may be medical records dating back to 1984. Many of these records are on paper and in different formats. OCR device 106 captures images of the records to generate a first set of electronic documents 108. First set of electronic documents 108 are the electronic or image versions of first set of documents 102. First set of electronic documents 108 may be images having pixels to represent the characters and graphics within first set of documents 102. OCR device 106 imports first set of documents 102 into system 100 by processing them.

Using the above example, a second set of documents 104 also may be imported into system 100 using OCR device 106. Second set of documents 104 may be company records kept on paper for the past several years. These records also may include different formats and even different languages. OCR device 106 captures second set of documents 104 to generate a second set of electronic documents 110. Second set of electronic documents 110 also may be images having pixels that represent the characters and graphics within second set of documents 104.

First set of documents 102 and second set of documents 104 include date fields wherein dates are provided for the document itself or some text or graphic within the documents. The date fields are not necessarily in the same place within each document. Further, the format used for the date field may vary. Some may used dd/mm/yyyy while others use mm/dd/yyyy. The characters used in the date fields also may be handwritten as well as "digital," or typed into the document.

First set of documents 102 is provided to storage system 112. Storage system 112 performs pre-processing of the documents before storing them within a document module. Storage system 112, however, includes a processor 114 that executes instructions to configure the storage system to perform specified functions. Processor 104 is connected to memory storage 116 by data bus 115. Memory storage 116 includes instructions 118. Instructions 118 may be code that, when read by processor 114, configures storage system 112 to perform the operations disclosed herein.

Processor 114 also may be coupled to input/output module 120 for storage system 112. Electronic documents may be imported from OCR device 106 at input/output module 120 over network 104. In some embodiments, storage system 112 and OCR device 106 may be in the same device such that network 107 and input/output module 120 are not used. Upon receipt of the electronic documents, processor 114 executes instructions 118 to configure storage system 112 to perform the pre-processing operations.

These operations may include processing a set of electronic documents, such as first set of electronic documents 108, using a handwriting recognition engine 122. Recognition engine 122 analyzes handwritten text within first set of documents 102 to determine if the characters handwritten on a document include a date field. In other words, someone wrote a date on the document. Recognition engine 122 identifies the portion of the document and indicates that it is a possible date field. Recognition engine 122 also may convert the handwritten characters into "digital," or American Standard Code for Information Interchange (ASCII), characters. The identified fields may be highlighted or identified within the electronic documents of first set of electronic documents 108.

First set of electronic documents 108 are analyzed by date field and format detector module 124 after importation into storage system 112.

In some embodiments, detector module 124 may receive first set of electronic documents 108 after they have been reviewed and processed by recognition engine 122. Detector module 124 detects one or more date fields within one or more documents of first set of electronic documents 108. Not every document will have a date field. Further, detector module 124 determines a format for the date characters within the date field, as shown in the examples above.

Date format adjustment module 126 receives first set of electronic documents 108 after the date fields having date characters are identified. Adjustment module 126 determines whether the format of the date characters in each date field matches a set format within storage system 112. This set format may be specified by a user, an administrator, company or organizational policy, and the like. Adjustment module 126 adjusts or modifies the date characters within the date field if they do not match the set format. In some embodiments, pixels within the electronic document for the date field are modified to correspond to the set format for date characters.

This adjustment results in a modified electronic document and an original electronic document within storage system 112. Both sets of electronic documents are stored within storage system 112. Thus, first set of electronic documents 108, as well as any modified electronic versions of the documents resulting in adjusted date fields, are stored at a document module, or storage. Storage system 112 may include first document module 128, second document module 130, and third document module 132. First document module 128 may store the processed and modified versions of first set of electronic documents 108. Second document module 130 may store the processed and modified versions of second set electronic documents 110. Third document module 132 may include the original versions of the electronic documents only. Each document module may include its own rules and management functions for the corresponding documents.

Figure 2:
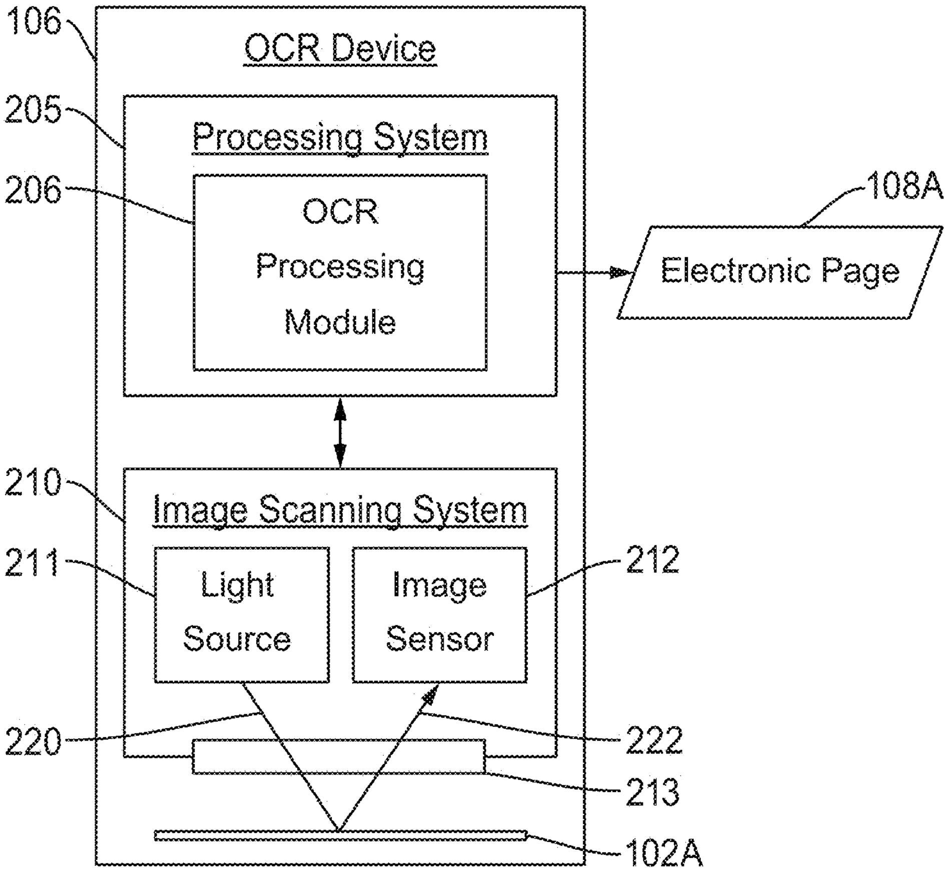
FIG. 2 illustrates an OCR device according to the disclosed embodiments.

FIG. 2 depicts OCR device 106 according to the disclosed embodiments. OCR device 106 receives a page or document 102A of first set of documents 102. Further pages may be loaded after processing of page 102A is complete. OCR device 106 includes an image scanning system 210 communicatively coupled to a processing system 205 via a communications link 207. Communications link 207 may be a wire, a communications cable, a wireless link, or a metal track on a printed circuit board.

Image scanning system 210 includes a light source 211 that projects light 220 through a transparent window 213 to strike a surface of page 102A. Page 102A, which may be a sheet of paper containing text or graphics, reflects light 220 towards an image sensor 212. Image sensor 212 contains light sensing elements, such as photodiodes or photocells, converts received light 222 into electrical signals that are transmitted to OCR processing module 206 within processing system 205. The electrical signals may be digital bits.

Processing system 205 generates electronic page 108A from the captured data for page 102A. Electronic page 108A is included in one of the electronic documents within first set of electronic documents 108. In some embodiments, OCR device 106 is a slot scanner incorporating a linear array of photocells. OCR processing module 206 that is a part of processing system 205 may be used to operate upon the electrical signals for performing optical character recognition of text and graphics printed on page 102A.

Figure 3:
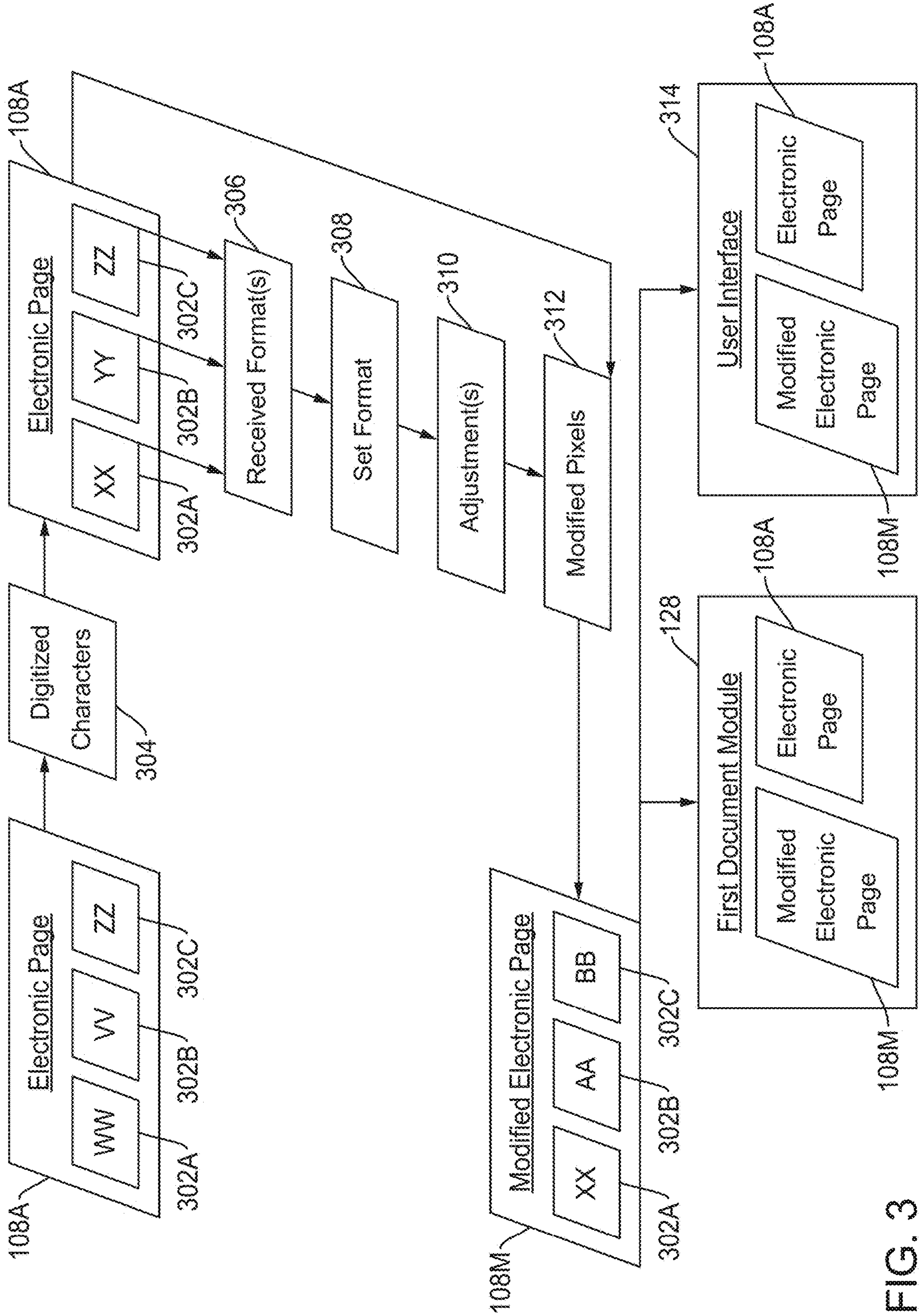
FIG. 3 illustrates a block diagram of data flow of an imported electronic page of an electronic document within adjustment module according to the disclosed embodiments.

FIG. 3 depicts a block diagram of data flow of an imported original electronic page 108A of an electronic document within adjustment module 126 according to the disclosed embodiments. Adjustment module 126 may receive original electronic page 108A from OCR device 106 or from recognition engine 122. Original electronic page 108 also goes through detector module 124 to detect date fields within original electronic page 108.

Original electronic page 108 include date fields 302A, 302B, and 302C. These may be regions in the electronic page that include data that may include date characters, such as a day, month, year, or any combination thereof. In some embodiments, the data characters may be handwritten and not in a digitized format using ASCII or other recognized computer processing symbols. For example, date field 302A may include date characters WW, date field 302B may include date characters VV, and date field 302C may include date characters ZZ. Of these, date characters WW and VV are handwritten while date characters ZZ are in an ASCII format.

Thus, recognition engine 122 may convert the date characters for date fields 302A and 302B into digitized characters 304. In some embodiments, recognition engine 122 may convert all of the handwritten text in original electronic document 108A into digitized characters 304. Recognition engine 122 may compare the pixels forming date characters WW and VV and match them against known ASCII symbols corresponding to the shape or forms of the text formed by the pixels. Original electronic page 108 is updated to include digitized characters for date fields 302A and 302B. Date field 302C is not revised as it does not include hand written characters.

After revisions with digitized characters 304, detector module 124 analyzes original electronic document 108A to detect date fields 302A, 302B, and 302C. Detector module 124 may be trained to detect date fields, such as detecting numbers or words corresponding to such items for use in showing a date, such as numbers 1-31, names of the months, or numbers having 2 or 4 digits, such as 84 or 1984. Further, detector module 124 may identify symbols, such as "/," "-," or other graphics that may denote separators between the day, month, or year in date characters.

After determining the date fields, adjustment module 126 identifies and modifies the date characters that do not match a set format 308 for date fields within first set of electronic documents 108. Second set of electronic documents 110 may have a different set format. If the date characters do not match set format 308, then they are modified from their visual representation by pixels within original electronic page 108A. Modified electronic page 108M is generated having the updated date fields.

For example, adjustment module 126 analyzes date fields 302A, 302B, and 302C identified by detection module 124 within original electronic page 108A. Date field 302A includes date characters XX. Date characters XX have a received format 306. Date field 302B includes date characters YY. Date characters YY also have a received format 306. Date field 302C includes date characters ZZ. Date characters ZZ also have a received format 306.

Received formats 306 for the date characters may differ. For example, received format 306 for date characters XX may be dd/mm/yyyy. Received format 306 for date characters YY may be mm-dd-yyyy. Received format 306 may date characters ZZ may be dd Aug yyyy. As may be appreciated, these date formats are not consistent. Further, they may cause confusion in documents if the month and day parameters are switched around within the document.

Set format 308 is the parameter set for date fields for electronic documents within first set of electronic documents 108. Storage system 112 may have several set formats for use with different sets of documents. Set format 308 is compared to received formats for the date characters of the date fields within original electronic page 108A. If set format 308 matches a received format for a date field, then nothing is changed for that date field in original electronic page 108. If set format 308 does not match, then adjustment module 126 generates adjustment(s) 310 for the date characters within the date fields not matching set format 308. Adjustment module 126 then implements modified pixels 312 within original electronic page 108A to make adjustments 310.

For example, set format 308 may be dd/mm/yyyy to be consistent with a regional preference, such as Europe or Japan. Received format 306 for date characters XX in date field 302A matches set format 308. No adjustment will be made to the date characters for date field 302A. Received format 306 for date characters YY in date field 302B does not match set format 308. Adjustment 310 is created for the date characters in date field 302B. Adjustment 310 will change received format 306 from mm-dd-yyyy to set format 308 of dd/mm/yyyy. Thus, adjustment module 126 will modify the pixels of date characters YY to those of date characters AA, which use set format 308. Modified pixels 312 are incorporated into original electronic page 108A. The same operations may be done for date field 302C having a received format 306 that does not match set format 308. Adjustment 310 modifies the pixels in date field 302C from date characters ZZ to date characters BB, which correspond to set format 308.

It should be noted that modified pixels are implemented automatically by adjustment module 126. Pixels may be re-arranged within original electronic page 108A so that the revised data matches set format 308. Adjustment module 126 compares the data characters to all possible formats. Once match to a format, the format is compared to set format 308 to determine if there is a match. For example, a received format of dd-mm-yyyy may be acceptable to a set format of dd/mm/yyyy. Adjustment module 126 may be trained to determine which format is being used within a date field.

Adjustment module 126 generates modified electronic page 108M having date fields 302A, 302B, and 302C with date characters XX, AA, and BB, respectively. Date characters XX, AA, and BB have formats acceptable for set format 308. Modified electronic page 108M differs from original electronic page 108A. Thus, two versions of the page exist. Place all the pages together for a document, and two very different documents may exist within storage system 112.

The disclosed embodiments store both the original document and the modified document within storage system 112. The user may wish to compare and correct any documents that have date fields not meeting set format 308. Thus, storage system 112 stores original electronic page 108A with modified electronic page 108M in first document module 128. In some embodiments, original documents may be stored separately from the jointly-filed documents in their own location within storage system 112.

The disclosed embodiments also may display original electronic page 108A with modified electronic page 108M. For example, user display 314 may display both pages for review by the user. In sets having hundreds of electronic documents, this may not be feasible so may be a specified number of pages may be displayed within user interface 314. The user also may select to review the pages by selecting them for review from first document module 128.

Figure 4:
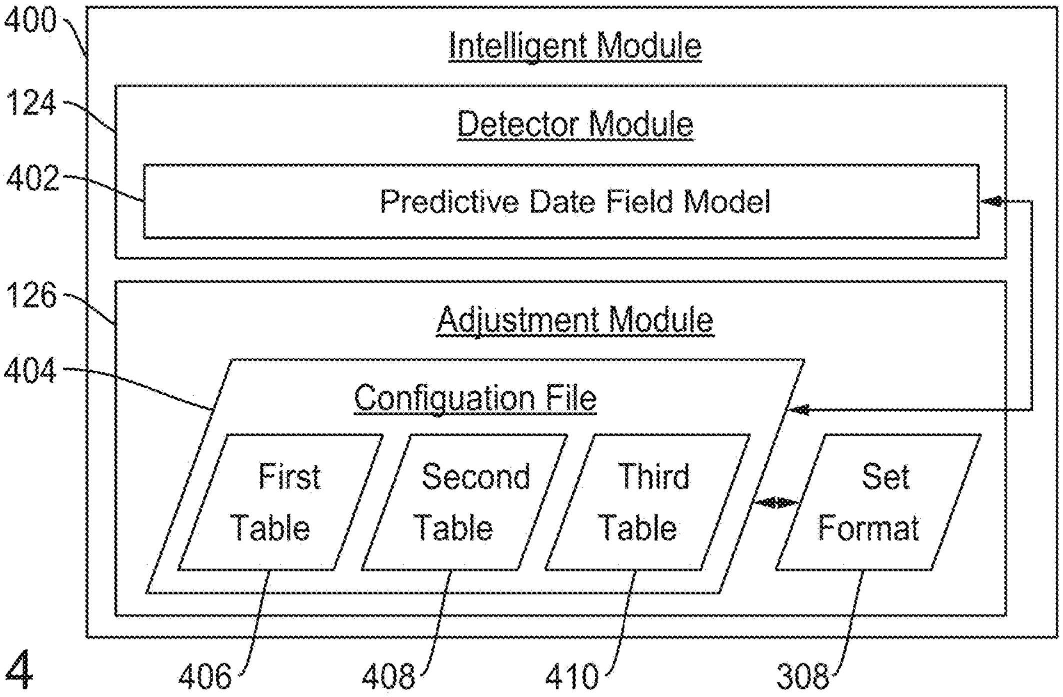
FIG. 4 illustrates a block diagram of a supervised learning pipeline for an intelligent module having a detector module and an adjustment module according to the disclosed embodiments.

FIG. 4 depicts a block diagram of an intelligent module 400 having detector module 124 and adjustment module 126 according to the disclosed embodiments. Intelligent module 400 may be implemented in storage system 112 to process incoming documents imported using OCR device 106. Output from intelligent module 400 may include original electronic documents and modified electronic documents having their date fields modified according to set format 308.

Detector module 124 detects date fields, such as date fields 302A, 302B, and 302C disclosed above, within documents. In some embodiments, recognition engine 122 may convert handwritten text into digitized text so that detector module 124 determines whether date fields are within handwritten documents. Detector module 124 may use predictive date field model 402 to determine whether characters within a document defines a date field. As disclosed above, dates may be provided in a number of formats. Predictive date field model 402 is trained to detect these formats and indicate the date fields within a document. This process is disclosed in greater detail by FIG. 5.

Adjustment module 126 determines if the date characters within a date field need to be changed to set format 308. The date characters for a date field may come in a received format 306, as disclosed in FIG. 3. Adjustment module 126 determines whether received format 306 for the date characters matches set format 308 for the imported documents. Adjustment module 126 may act as a smart module using configuration file 404 having all possible date formats listed therein. Adjustment module 126 may check received format 306 for date characters against entries within configuration file 404.

Configuration file 404 includes first table 406, second table 408, and third table 410. Additional tables may be provided within configuration file 404. Tables 406-410 may be lookup tables for date formats in different languages. Adjustment module 126 may compare the received format for the date characters in different languages to date formats in the tables. For example, first table 406 may include date formats in English. Second table 408 may include date formats in Chinese. Third table 410 may include date formats in Japanese. Adjustment module 126 compares the received date characters to the corresponding date formats for set format 308. Information flows from configuration file 404 to adjustment module 126 so that it adjusts the data formats.

Adjustment module 126 also adjusts the date characters within a date field of the imported document to match set format 308. Again, tables 306, 308, and 310 may be used to change the date characters according to the instructions regarding the table. For example, if set format 308 has a corresponding format in Japanese, then third table 410 may be used to modify the date characters in a date field that is in Japanese. The proper format in Japanese corresponding to set format 308 may be in third table 410.

Configuration file 404 may be configurable by an administrator or user. Further, different configuration files 404 may be generated for different users. The administrator or user also may update configuration file 404. There is no runtime update to configuration file 404 as configuration file 404 is a static file for the most part.

Figure 5:
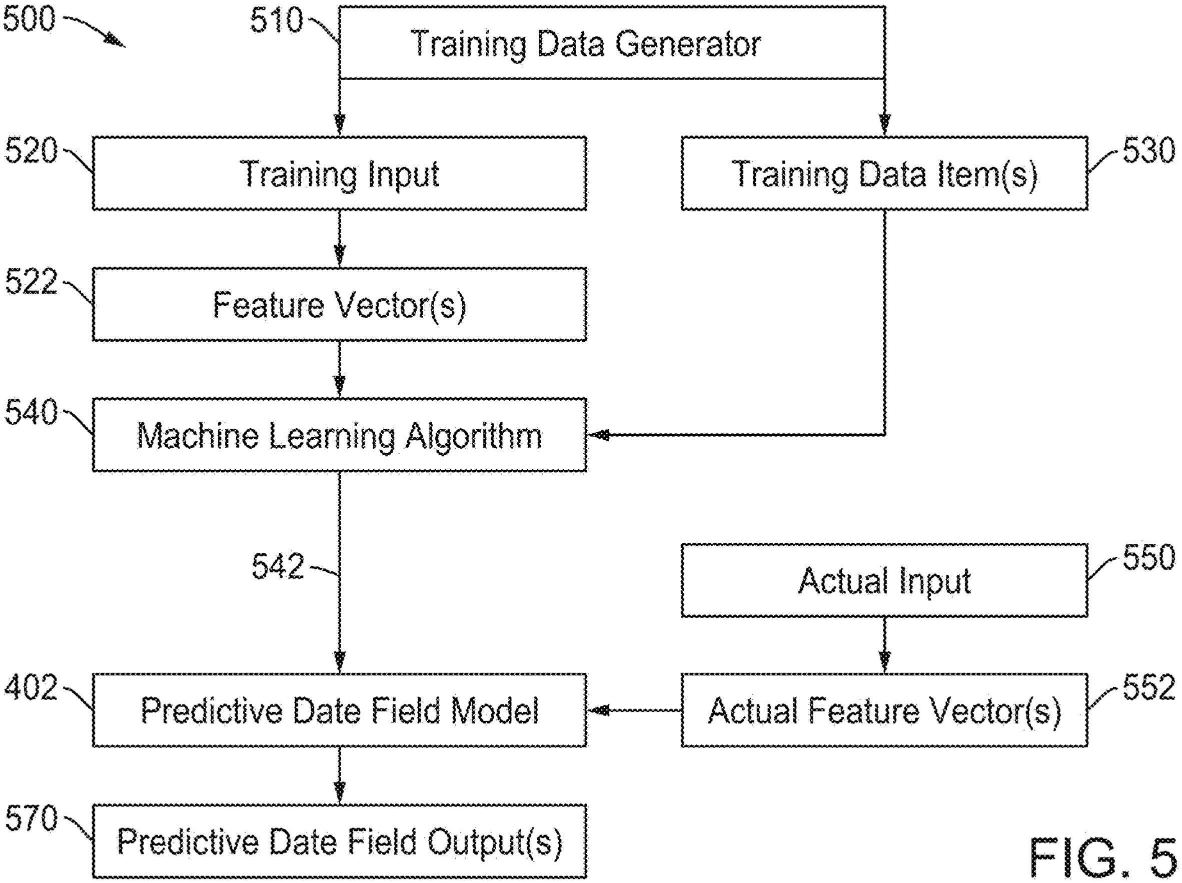
FIG. 5 illustrates a block diagram of a supervised learning pipeline for a predictive date field model according to the disclosed embodiments.

FIG. 5 depicts a block diagram of a supervised learning pipeline 500 for predictive date field model 402 according to the disclosed embodiments. Supervised learning pipeline 500 includes training data generator 510, training input 520, one or more feature vectors 522, one or more training data items 530, machining learning algorithm 540, actual input 550, one or more actual feature vectors 552, predictive date field model 402, and one or more predictive date field outputs 570. Part or all of supervised learning pipeline 500 may be implemented by executing software for part or all of supervised learning pipeline 500 one or more processors 114 or other components within storage system 112.

In operation, supervised learning pipeline 500 may involved two phases: a training phase and a prediction phase. The training phase may involve machine learning algorithm 540 learning one or more tasks related to detecting date fields within an electronic document. The prediction phase may include predictive date field model 402, which is a trained version of machine learning algorithm 540 and makes predictions to accomplish one or more tasks for identifying the date fields. In some embodiments, machine learning algorithm 540 or predictive date field model 402 may include one or more artificial neural networks (ANNs), deep neural networks, convolutional neural networks (CNNs), recurrent neural networks, support vector machines (SVMs), Bayesian networks, genetic algorithms, linear classifiers, non-linear classifiers, algorithms based on kernel methods, logistic regression algorithms, linear discriminant analysis algorithms, or principal components analysis algorithms.

During the training phase of supervised learning pipeline 500, training data generator 510 may generate training input 520 and training data item(s) 530. Training input 520 may be processes to determine one or more feature vectors 522. In some embodiments, training input 520 may be preprocessed. For example, for optical character recognition tasks, training input 520 may be preprocessed to calculate bounding boxes or other location information of text showing date fields within a document. Other location information of text or date characters as well as objects in input images may be provided as part of training input 520. In some embodiments, training data generator 510 is not used to generate training input 520 or training data items(s).

In some embodiments, some or all of training input 520 includes one or more electronic training documents. An electronic document may include one or more text images, images that do not include text, and documents encoded using a page definition language (PDL). Some or all of training input 520 also may be generated by scanning one or more paper training documents into corresponding electronic documents using OCR device 106. Alternatively, some or all of training input 520 is generated by printing at least one or more electronic training documents to paper, such as documents expressed using a PDL, and then generating an electronic copy of the at least one electronic training documents by scanning the printed versions of the at least one electronic training documents into corresponding electronic documents.

Feature vector(s) 522 may be provided to machine learning algorithm 540 to learn one or more tasks for detecting a date field within an electronic document, such as one or more documents from first set of electronic documents 108. After performing the one or more tasks, machine learning algorithm 540 may generate one or more outputs 542 based on feature vector(s) 522 and, optionally, training data items 530.

During training, training data items 530 may be used to make an assessment of the outputs 542 of machine learning algorithm 540 for accuracy. Machine learning algorithm 540 may be updated based on this assessment. Training of machine learning algorithm 540 is considered to be trained to perform the one or more tasks for detecting a date field. Once trained, machine learning algorithm 540 may be considered to be predictive date field model 402. In other words, predictive date field model 402 may be generated from the training of machine learning algorithm 540. In some embodiments, machine learning algorithm 540 also is known as a model.

During the prediction phase of supervised learning pipeline 500, actual input 550 may be used to generate one or more actual feature vectors 552. In some embodiments, some of all of actual input 550 includes one or more electronic documents or paper documents converted into electronic documents by OCR device 106. Actual input 550 may be provided to predictive date field model 402 via actual feature vector(s) 552. Predictive date field model 402 may generate one or more outputs, such as predictions, based on actual input 550. The outputs of predictive date field model 402 may be provided as predictive date field outputs 570. Predictive date field outputs 570 are provided to adjustment module 126 to indicate that the predicted date field should be examined for adjusting the format of the date characters in the predicted date field.

Actual input 550 may be a document from first set of electronic documents 108. Each original electronic page 108A may be used to generate actual feature vectors 552 into predictive date field model 402. Predictive date field model 402 examines the text in original electronic page 108A to determine a prediction for the characters. For characters having a predicted value high enough to be a date field, detector module 124 indicates those characters as being date characters and their location being a date field in original electronic page 108A.

Predictions of date fields may include prediction of one or more characters, words, or other textual units. A prediction of a date field may include an electronic representation of date characters depicted in a corresponding input image, such as a text image in training input 520 or a text image in actual input 550. The electronic representation of the text can be formatted using one or more text formats.

In some embodiments, a prediction of a date field may include a confidence value or other data related to the accuracy of the predicted date field. The confidence value may be determined by machine learning algorithm 540 as part of determining the output prediction for predictive date field output 570. For example, a confidence value in the range of 0 to 100 may be determined for, and may be output with, an output prediction of a date field, where a confidence value of 0 would indicate that machine learning algorithm 540 has no confidence, or 0% confidence, in the output prediction. A confidence value of 100 would indicate that machine learning algorithm 540 has a certain confidence, or 100% confidence, in the output prediction. A value between 0 and 100 would indicate a percentage confidence in the output that an identified part of original electronic page 108A is a date field.

For example, the disclosed embodiments may indicate that if characters within original electronic page 108A have a greater than 50% confidence, or predicted value, to be a date field, then detector module 124 will mark these characters as a date field within the page. The confidence threshold may be adjustable. In some instances, the threshold may be kept low as date fields are pretty recognizable, or include numbers in a document that does not include many numbers. For a document having a lot of numbers, the confidence threshold may be increased, such as to 75%.

Thus, intelligent module 400 may identify and adjust date fields within an electronic document that do not comply with set format 308. These actions may be done automatically without the need to correct the date characters within the document manually. Further, by limiting the adjustments to dates within the documents, the importation and processing of the documents may be completed in a timely manner as opposed to changing text for several reasons throughout the document.

Figure 6:
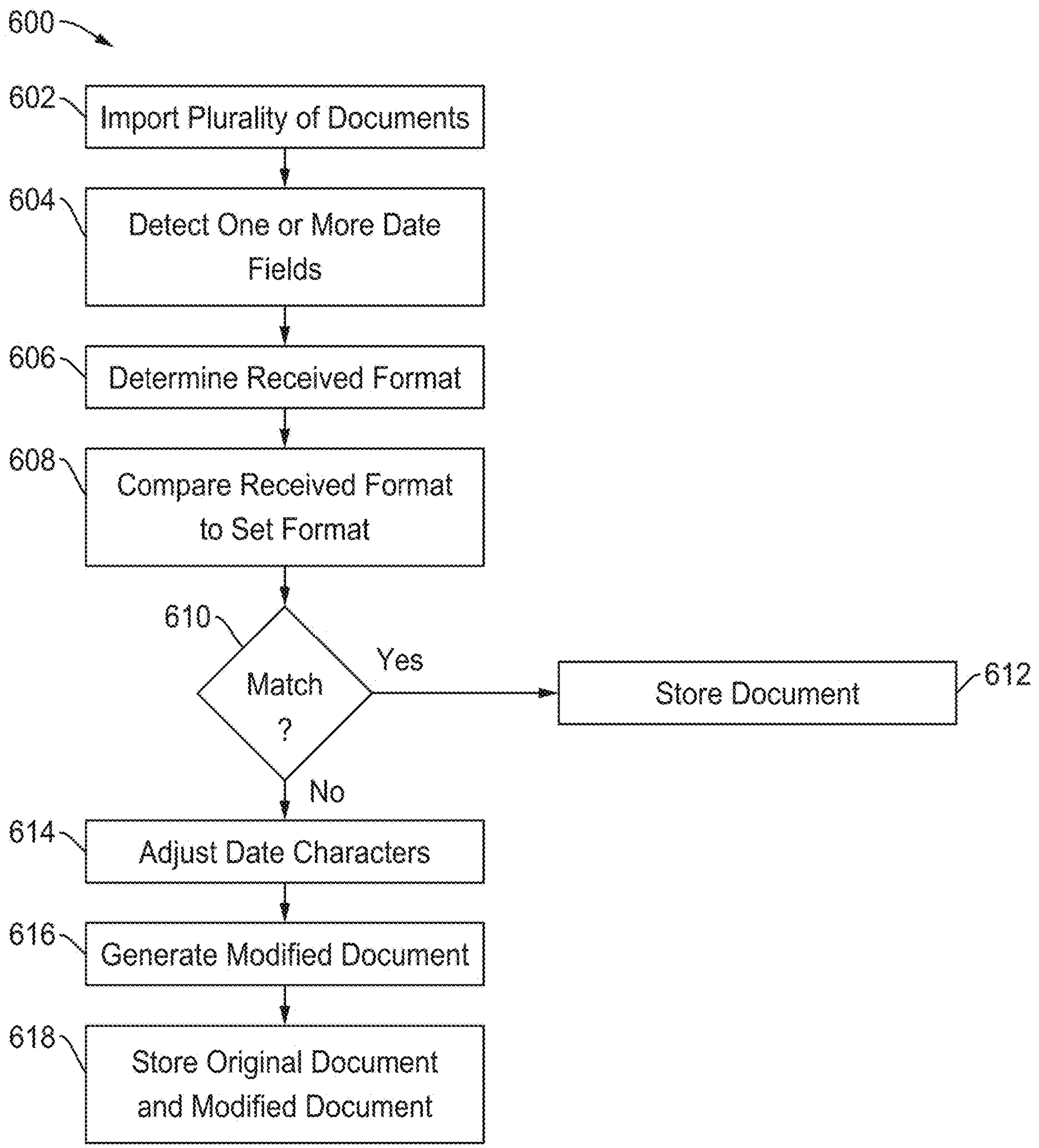
FIG. 6 illustrates a flowchart for the end-to-end system workflow for a plurality of uploaded documents according to the disclosed embodiments.

FIG. 6 depicts a flowchart 600 for automatically formatting a date field within a document according to the disclosed embodiments. Flowchart 600 may refer to FIGS. 1-5 for illustrative purposes. Flowchart 600, however, is not limited by the embodiments disclosed by FIGS. 1-5.

Step 602 executes by importing a plurality of documents into storage system 112 using OCR device 106. For example, first set of documents 102 may be scanned by OCR device 106 to generate first set of electronic documents 108. A plurality of documents may be done at once to import a large set of documents, such as 100s or 1000s of documents at once.

Step 604 executes by detecting one or more date fields within one or more electronic documents of first set of electronic documents 108. Each page of each document may be analyzed by intelligent module 400, or specifically detector module 124, to identify one or more date fields, such as date fields 302A, 302B, and 302C, within one or more pages of the document. In some embodiments, detector module 124 may use predictive date field model 402 to determine which groups of characters in the electronic document form a date field. The predicted date fields are passed to adjustment module 126.

Step 606 executes by determining a received format 306 for each date field within the original electronic document. Adjustment module 126 may determine what format is being used within the identified date field. Examples of various formats are disclosed above. Step 608 executes by comparing received format 306 to set format 308 for the imported documents. Set format 308 may be the preferred format for date fields within the documents and set by the user, the administrator of the imported documents, and the like.

Step 610 executes by determining whether received format 306 and set format 308 for the date field within the original electronic document match. The term match may include a partial match. For example, a score may be generated on how many characters in the identified date field match the characters for set format 308. If it is above a certain percentage, such as 80%, then the formats may be considered a match. If step 610 is yes, then step 612 executes by storing the original electronic document in storage system 112.

If step 610 is no, then step 614 executes by adjusting the date characters in the identified date field to match set format 308. For example, if the date characters in the identified date field are in a mm/dd/yyyy format and set format 308 is dd/mm/yyyy, then adjustment module 126 will adjust the characters with the date field to be dd/mm/yyyy. Pixels for the characters are modified within the original electronic document to match set format 308.

Step 616 executes by generating a modified electronic document having the adjusted date fields. For example, modified electronic page 108M is generated having date characters within one or more date fields 302A, 302B, and 302C changed. Step 618 executes by storing the original electronic document having the date fields in their original format along with the modified electronic document having the date fields modified to match set format 308. The documents also may be displayed along side each other in a user interface 314, showing the differences in the date fields of the documents.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the “C” programming language or similar programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing documents, the method comprising:

importing a plurality of documents into a storage system using an optical character recognition device, wherein the plurality of documents is scanned to capture characters;

detecting a date field having date characters within the captured characters of an original electronic document generated from the plurality of documents;

determining a received format for the date characters within the date field;

determining that the received format does not match a set format for the date characters within the storage system;

adjusting the date characters within the date field of the original electronic document to match the set format, wherein pixels for the date characters are modified within the original electronic document to generate a modified electronic document; and storing the modified electronic document and the original electronic document in the storage system, wherein the modified electronic document includes the date characters in the date field in the set format and the original electronic document includes the date characters of the date field in the received format.

2. The method of claim 1, further comprising determining whether the date characters within the date field are handwritten.

3. The method of claim 2, further comprising digitizing the date characters into the received format.

4. The method of claim 2, further comprising converting the date characters into the received format.

5. The method of claim 1, wherein detecting the date field includes applying a trained smart module to the original electronic document to identify data corresponding to a time or date entry.

6. The method of claim 1, further comprising displaying the modified electronic document and the original electronic document at a user interface.

7. The method of claim 6, wherein the modified electronic document and the original electronic document are displayed in parallel.

8. A non-transitory computer-readable medium having stored thereon processor-executable instructions for performing operations comprising:

importing a plurality of documents into a storage system using an optical character recognition device, wherein the plurality of documents is scanned to capture characters;

detecting a date field having date characters within the captured characters of an original electronic document generated from the plurality of documents;

determining a received format for the date characters within the date field;

determining that the received format does not match a set format for the date characters within the storage system;

adjusting the date characters within the date field of the original electronic document to match the set format, wherein pixels for the date characters are modified within the original electronic document to generate a modified electronic document; and storing the modified electronic document and the original electronic document in the storage system, wherein the modified electronic document includes the date characters in the date field in the set format and the original electronic document includes the date characters of the date field in the received format.

9. The non-transitory computer-readable medium of claim 8, further comprising determining whether the date characters within the date field are handwritten.

10. The non-transitory computer-readable medium of claim 9, further comprising digitizing the date characters into the received format.

11. The non-transitory computer-readable medium of claim 8, further comprising converting the date characters into the received format.

12. The non-transitory computer-readable medium of claim 8, wherein detecting the date field includes applying a trained smart module to the original electronic document to identify data corresponding to a time or date entry.

13. The non-transitory computer-readable medium of claim 8, further comprising displaying the modified electronic document and the original electronic document at a user interface.

14. The non-transitory computer-readable medium of claim 13, wherein the modified electronic document and the original electronic document are displayed in parallel.

15. A system comprising:

a storage system to store electronic documents;

an optical character recognition device coupled to the storage system to scan and generate the electronic documents from a plurality of documents;

a processor;

a memory storing instructions that, when executed on the processor, configures the system to import the plurality of documents into the storage system using the optical character recognition device, wherein the plurality of documents are scanned to capture characters;

detect a date field having date characters within the captured characters of an original electronic document generated from the plurality of documents;

determine a received format for the date characters within the date field;

determine that the received format does not match a set format for the date characters within the storage system;

adjust the date characters within the date field of the original electronic document to match the set format, wherein pixels for the date characters are modified within the original electronic document to generate a modified electronic document; and store the modified electronic document and the original electronic document in the storage system, wherein the modified electronic document includes the date characters in the date field in the set format and the original electronic document includes the date characters of the date field in the received format.

16. The system of claim 15, wherein the processor is located at the storage system or the optical character recognition device.

17. The system of claim 15, wherein the processor is further configured to determine whether the date characters within the date field are handwritten.

18. The system of claim 17, wherein the processor is further configured to digitize the date characters into the received format.

19. The system of claim 15, wherein the processor is further configured to convert the date characters into the received format.

20. The system of claim 15, wherein the processor is further configured to determine date format for a language different from a language of the set format.

* * * * *